United States Patent
Barlet-Gouedard et al.

(10) Patent No.: US 6,312,515 B1
(45) Date of Patent: *Nov. 6, 2001

(54) CEMENTING COMPOSITIONS AND THE APPLICATION OF SUCH COMPOSITIONS TO CEMENTING OIL OR ANALOGOUS WELLS

(75) Inventors: Veronique Barlet-Gouedard, Sceaux; Bernard Dargaud, Elancourt; Andre Garnier, Saint-Cyr-l'Ecole; Pierre Maroy, Buc, all of (FR)

(73) Assignee: Schlumberger Technology Corporation, Sugar Land, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/664,018

(22) Filed: Jun. 12, 1996

(30) Foreign Application Priority Data

Jun. 13, 1995 (FR) .................................................. 95 07010

(51) Int. Cl.$^7$ ................................................... C04B 24/24
(52) U.S. Cl. ........................ 106/709; 106/724; 106/737; 106/823; 106/DIG. 1
(58) Field of Search ..................................... 106/705, 708, 106/709, 721, 696, 724, 737, 739, 714, 745, 756, 763, 767, 771, 789, 790, 823, DIG. 1

(56) References Cited

U.S. PATENT DOCUMENTS 4,941,536    7/1990  Brothers et al. .

FOREIGN PATENT DOCUMENTS

| 0 497 691 A1 | 1/1992 | (EP) . |
| 0 611 081 A3 | 1/1994 | (EP) . |
| 0 621 247 A3 | 4/1994 | (EP) . |
| WO 90/11977  | 10/1990 | (WO) . |
| WO 90/13524  | 11/1990 | (WO) . |

OTHER PUBLICATIONS

"Silica Powder Continuing Grout" Hirano JP 04219353 Aug. 10, 1992 (Japan).

*Primary Examiner*—Paul Marcantoni
(74) *Attorney, Agent, or Firm*—Robin C. Nava; Thomas O. Mitchell; John J. Ryberg

(57) ABSTRACT

The invention concerns cementing compositions, particularly for squeeze cementing, comprising a liquid phase and a solid phase constituted by particulate materials which are insoluble in said liquid phase, in particular a microcement. The compositions of the invention comprise additives of a nature and composition such that variations in viscosity of the composition due to fluid loss are minimized. Preferably, the compositions comprise at least one "very fine" additive formed from particles which are smaller than the cement, with a ratio of the average grain sizes of the particles of said additive and those of the cement in the range 5 to 100, preferably about 10, the respective proportions of the solid particles corresponding to a packing volume fraction close to the maximum, and the porosity of the solid mixture being such that the mixture is in a state of hindered settling.

13 Claims, 2 Drawing Sheets

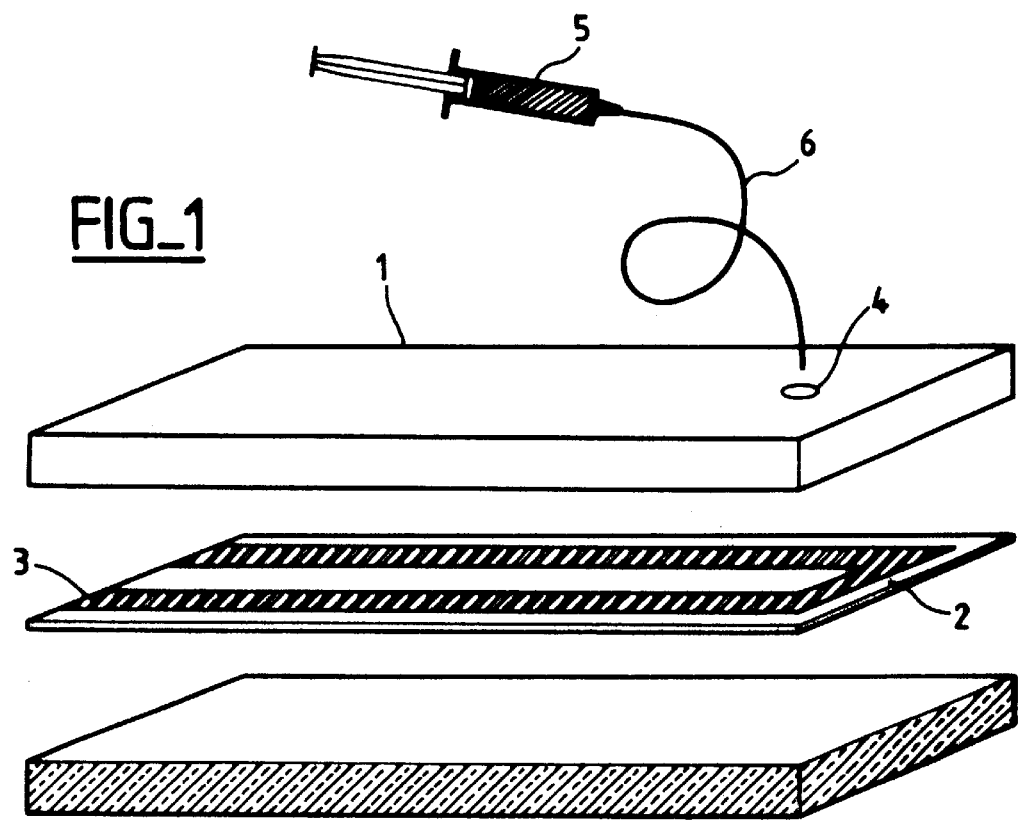
FIG_1
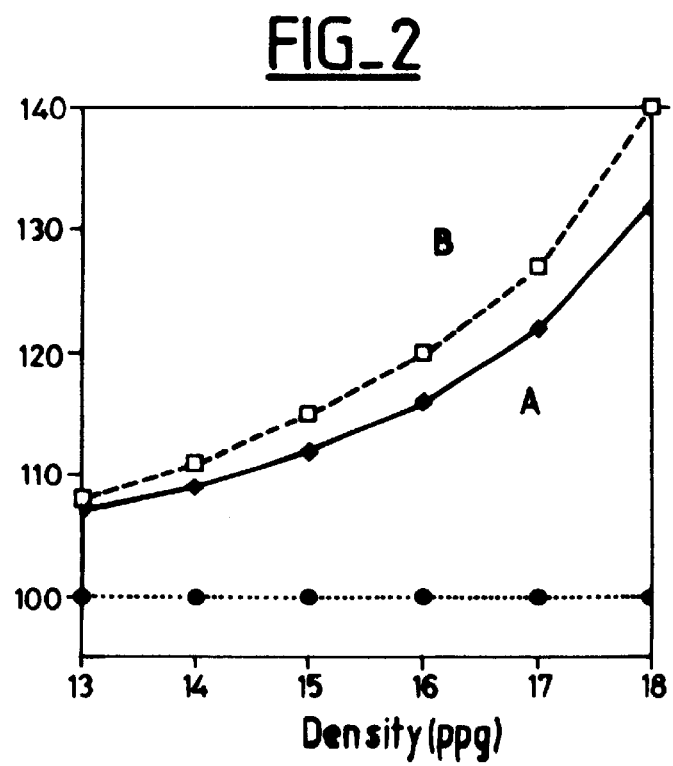
FIG_2

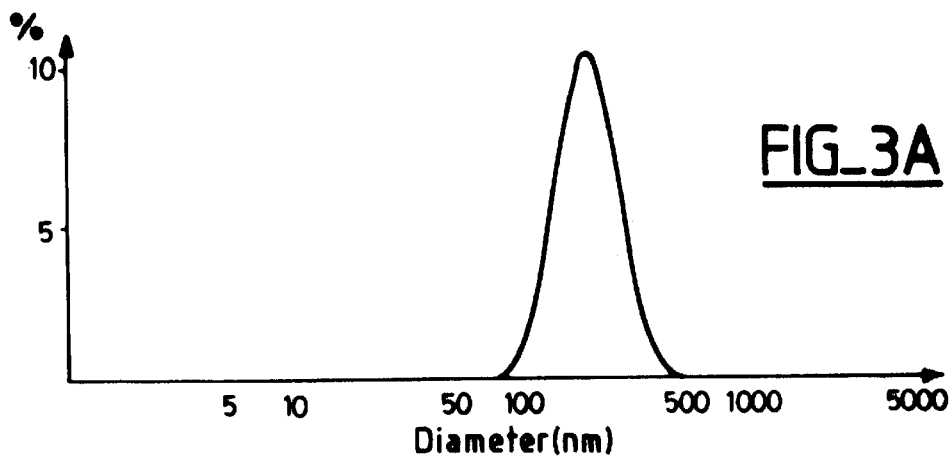
FIG_3A
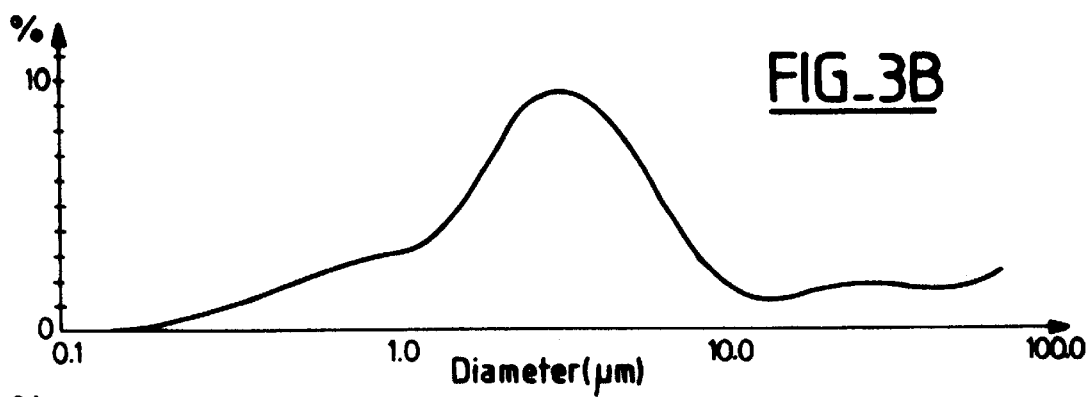
FIG_3B
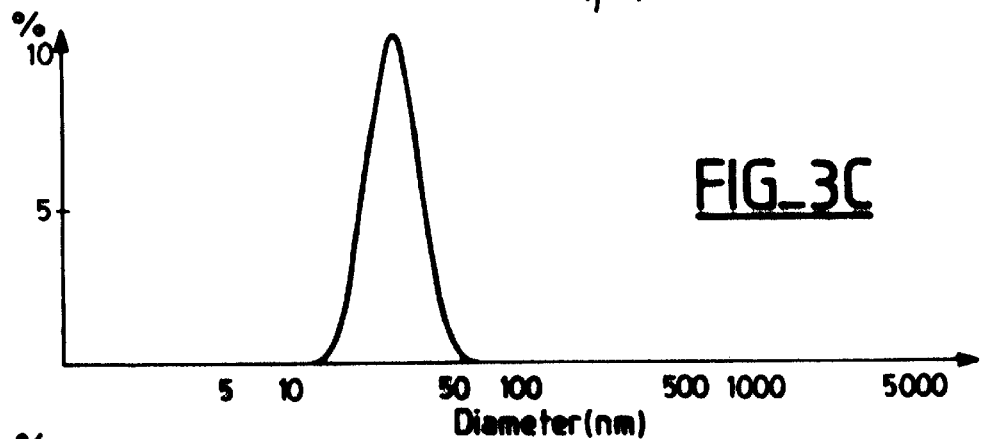
FIG_3C
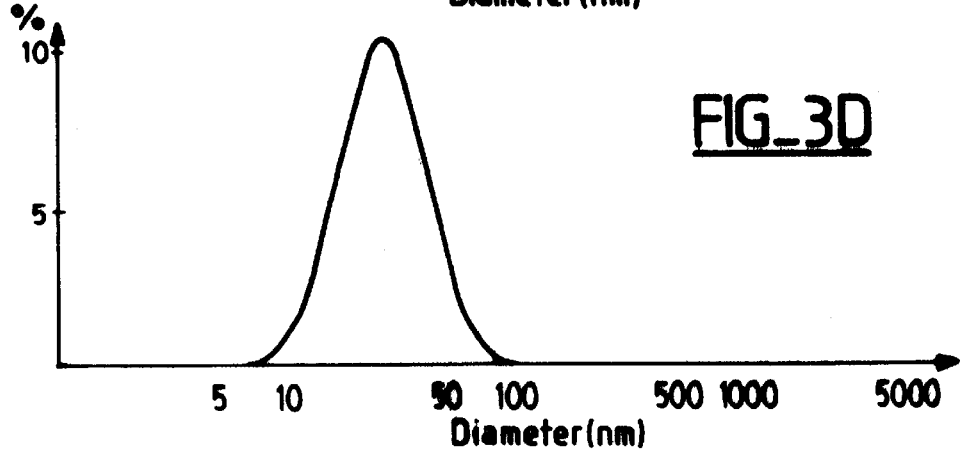
FIG_3D

CEMENTING COMPOSITIONS AND THE APPLICATION OF SUCH COMPOSITIONS TO CEMENTING OIL OR ANALOGOUS WELLS

The present invention concerns drilling techniques in oil, gas, water, geothermal and analogous wells. More precisely, the invention concerns cementing compositions and their application to cementing such wells.

Before an oil well goes into production, a casing or coiled tubing is lowered into the borehole and cemented over all or a part of its length. Cementing primarily prevents fluid exchange between the various formation strata around the borehole and stops gas from rising through the annular space surrounding the casing, or limits the ingress of water into the production well.

In some cases, it appears that the cemented annular space does not fulfill its primary function and fluids find a path through pores, micro-cracks or other cavities in the cement or through a "micro-annular" space at the interface between the cement and the casing or between the cement and the formation. Holes or cracks may also have been made deliberately, for example at the beginning of well life, but may become undesirable as exploitation of the well continues.

In order to overcome such faults in sealing, repair or squeeze cementing must be carried out. During such operations, a slurry of fine cement is injected under pressure into the cracks, micro-cracks or other openings which are to be blocked.

The principal technical difficulties connected with squeeze cementing are also encountered during other operations, in particular positioning cement plugs, for example to isolate a zone in the well for specific treatment or for cementing gravel packing. This packing is used to filter the sand in unconsolidated formations while allowing the oil to flow through. However, after exploitation of a well, the productive zones of the formations can be invaded by brine and it becomes necessary to remove the gravel packing—with all its ensuing problems—or to plug it by cementing through the gravel.

A cement slurry is a dispersion of solid particles, assumed to be spherical, in a fluid. The slurry can only penetrate into a crack if the largest particles are smaller than the crack. This is quite clear, but a feature which is well known to all specialists in the flow of suspensions must be taken into account, namely that a slurry can penetrate deeply into a crack only if the diameter of its particles is three or more times smaller than the diameter of the crack opening.

An ordinary Portland cement contains particles with an average diameter of the order of 20 micrometers ($\mu$m), the largest particles having a diameter of the order of 70 $\mu$m to 90 $\mu$m. Under such conditions, the cement slurry ought to be able to penetrate easily into crevices that are 300 $\mu$m across, for example. This is certainly not the case in practice.

Fine or ultra fine cements have thus been proposed which have an average diameter of less than 10 $\mu$m, or just a few micrometers, with the largest particles not exceeding 30 $\mu$m, for example. Those cements, usually termed "microcements", have relatively disappointing performance as regards ability to penetrate, even when they are thoroughly dispersed using the usual dispersing additives such as polyanions containing sulfonate groups.

Further, since the reactivity of a cement slurry increases with the specific surface area of its particles, i.e., with its degree of fineness, it is not always wise to reduce the size of the cement grains too much, as there is a risk of the cement setting too quickly, before the positioning operation is complete.

The aim of the present invention is to provide novel compositions for squeeze cements, in particular for cementing operations in oil, gas, water, geothermal and analogous wells, which compositions have improved penetration properties compared with known prior art compositions.

We have discovered that the poor results obtained with prior art compositions are usually attributable to an excessive increase in the viscosity of the cement slurry due to fluid loss.

The cracks or other openings which are to be blocked by squeeze cementing are all at least in part delimited by porous walls (the formation around the borehole or hardened cement from a primary cementation) which constitutes a major difference compared with conventional flow in a conduit. The slightly porous medium tends to dry out the cement slurry by removing a portion of its aqueous phase, resulting in an increase in the viscosity of the slurry, thereby increasing friction with the walls and hindering further progress of the slurry into the crack. This increase in friction tends to encourage exchange with the porous medium thus generating more fluid loss. The cement slurry must be very stable since injection into a narrow crevice encourages settling and the formation of free water which can lead to pseudochromatography, namely the densest particles of the slurry being deposited at the entrance to the crack—which, of course, blocks deeper penetration of the remaining slurry to be injected into the crack. Further, it is clear that the small amount of cement slurry which succeeds in penetrating into the crack will not produce a good quality cement, in particular since its strength is very low.

It should be emphasized that squeeze cementing operations are always in a less favorable position as regards fluid loss since exchange areas with formations or other porous media are much larger. For primary cementation (cementation of the annular space around a casing), the area-to-volume ratio is generally less than 1 and often of the order of 0.4. In contrast, ratios of the order of 25 are normal for squeeze cementing operations.

A first object of the present invention is thus constituted by cementing compositions for injection under pressure having, at well temperature, fluid loss of less than 30 ml, preferably less than 20 ml and more preferably less than 15 ml, the values being measured using the API (American Petroleum Institute) standard, Spec. 10, Appendix F.

It should be noted that the prior art has largely underestimated the importance of fluid loss for squeeze cementing compositions. Current recommendations, based mainly of the work of Hook, F. E. and Ernst, E. A. [SPE 15104, 1969, "The Effects of Low-Water-Loss Additives, Squeeze Pressure, and Formation Permeability on the Dehydration Rate of a Squeeze Cementing Slurry"], are not to go beyond 200 ml API, for example, in formations of extremely low permeability, 100 ml to 200 ml API in slightly permeable formations, and 35 ml to 100 ml API in highly permeable formations (permeability greater than 100 millidarcy). Further, the majority of low fluid loss additives increase the plastic viscosity of the cement slurry while the prime criterion of the prior art is the need for plastic viscosity which is as low as possible to facilitate penetration of the slurry into the cracks.

Insofar as fluid loss can be greatly reduced but not completely avoided, it is advantageous for the rheology of the cement slurry to be as low as possible. The term "rheology" covers not only plastic viscosity, the importance of which is recognized in the prior art as indicated above, but also, and to a certain extent mainly, the yield point of the slurry. Relatively large fluid losses are tolerated better when the initial rheology of the formulation is low.

High rheology increases the pressure drop, and thus the pressure which must be exerted on the fluid to force it into the crack. However, an increase in this pressure contributes to an increase in fluid loss which, as already seen, is highly deleterious. High yield points also cause fingering in the crevice to be filled.

Preferred compositions of the invention have a yield point of less than 10 lbf/100 ft$^2$ (478.8 Pa), preferably less than 5 lbf/100 ft$^2$ (239.40 Pa), and more preferably less than 2 lbf/100 ft$^2$ (95.76 Pa). Plastic viscosity is preferably less than 100 cP (0.1 Pa.s).

To this end, the compositions of the invention include a dispersing agent which reduces the rheology of the cement slurry. Normal dispersing agents can be used. Examples are polyelectrolytes, i.e., charged water-soluble polymers, in particular polyanions containing sulfonate groups fixed on a backbone constituted by a highly branched polymer, such as polymelamine sulfonate (PMS), polynaphthalene sulfonate (PNS), the condensation product of melamine/formaldehyde containing sulfonate groups, polystyrene sulfonate or hgno-sulfonates. Low molecular weight polyacrylic acids constitute another large class of ionic dispersing agents which are widely used in the building industry but little used in oil industry cements because of their high retarding effect. Other non ionic dispersing agents such as low molecular weight polysaccharides, cellulose derivatives, polyvinyl alcohol, etc., are also known.

Any operation in an oil well demands a formulation which is stable over a relatively long period and it is clear that it would be useless to produce a sophisticated formulation using various additives if the slurry injected into the cracks were quite different. In particular, this requires that the cement slurry has no, or practically no, tendency to segregate, which means the existence of very low quantities of free water. As indicated above, instabilities give rise to pseudochromatography in the crevice which is to be blocked. Preference is thus given to compositions with a free water quantity of about 0 ml, for example less than 2 ml, measured under the conditions of API Spec 10 (Section 6 or Appendix M). Settling is preferably less than 5%, more preferably less than 2%.

Since in squeeze work the density of the slurry does not play a large role except for the strength of the set cement, the density of the squeeze cement slurry of the invention can be adjusted fairly freely as a function of the characteristics of the surrounding rock to balance the pressures exercised by the formation and the injected slurry. A slurry which is too dense risks damaging the rock in the manner of a fracturing fluid; otherwise, if the density is too low, there is a risk of external fluids intruding. Density is adjusted in known fashion by adjusting the quantity of water and by adding a suitable quantity of particulate additives such as silica, sand, industrial waste, clay, barite, etc.

The cement is preferably a microcement, but it should be emphasized that in many cases, an ordinary cement can be used, as is shown below. The term "microcement" means a cement formed from particles with an average grain size of less than 15 $\mu$m, preferably in the range 0.3 $\mu$m to 10 $\mu$m. Microcements containing particles no larger than 30 $\mu$m are more preferred, with a particle size distribution such that at least 90% have a diameter of less than 20 $\mu$m and 50% have a diameter of less than 7 $\mu$m.

The chemical composition of the microcements of the invention can be that of a Portland type cement, a blast furnace clinker, a Portland cement/blast furnace clinker mixture, or Portland cement/silica ash mixtures.

In order to minimize both rheology and fluid loss, the addition of particles which are finer than the microcement and insoluble in the liquid phase is particularly preferred. The proportions of solid materials both relative to one another and as a function of their respective grain sizes, are chosen such that the packing volume fraction (PVF) is maximized or, at least, the conditions are such that maximum PVF is almost achieved.

The choice of proportions of the solid materials with respect to the liquid (or slurry mixing fluid) is such that the resulting slurry is in the hindered settling state where the solid particles behave collectively as a solid porous material, the percentages of the various fractions being the same from top to bottom of the column, while outside this area, particles of different sizes or of different densities settle out separately at different rates. In practice, this threshold, which depends on the selected grain sizes, corresponds to concentrations of solid materials which are much higher than those used in the art for cementing compositions.

The volume ratio between this particulate additive and the cement is normally in the range 10% to 50%, preferably in the range 20% to 40%, and more preferably close to 30%. The nature of the additive is not critical providing that it is compatible with the cement, is on average mainly spherical, without anisotropy, and has a grain size different from that of the cement.

Under these conditions it appears that, for identical fluid loss, a composition of the invention has a smaller increase in viscosity than does an ordinary composition without an additive. This feature is all the more true when the density of the cement is higher. Thus a cement without an additive, after a fluid loss of 100 ml, has a viscosity equal to that of a fluid of the invention when it has lost 130 ml, these values being given for slurries with a density of 18 ppg (2.15 g/cm$^3$).

A particularly preferred example of a particulate additive of the invention is constituted by latexes, in particular styrene-butadiene latexes, SBR (Styrene-Butadiene Rubber) which are advantageously perfectly compatible with cements and are available with grain sizes of the order of 0.15 $\mu$m to 0.4 $\mu$. These latexes are preferably used together with a dispersing agent, especially if the cement slurry has a solid matter content of more than 35% or 40%. Examples of dispersing agents are sulfonates such as polynaphthalene-sulfonate (PNS) or melamine sulfonate; other anionic dispersing agents are also suitable.

Other particulate additives, characterized by grain sizes close to those of SBR latexes, can also be used with very good results. Particular examples are particles constituted by a silica ash type silica condensate, a condensate of manganese oxides in pigment ash, some fine soots, carbon black, and some polymer microgels such as a fluid loss control agent. In the following text, these particles are designated very generally as "very fine".

With the exception of latex and polymer microgels, these particles are not known as fluid loss control agents. However, under the preferred conditions of the invention they can produce very low fluid loss even in the absence of any additive specifically for low water loss.

It can thus be seen that preferred compositions of the invention comprise:
  a fluid base, in particular an aqueous base,
  a dispersing agent in solution in the aqueous phase and, optionally, other liquid additives which are known in the art, in particular antifoaming agents and retarding agents; or more exceptionally, cement curing agents,
  solid particles in the form of combinations from the following categories:
    "fine", cement particles with an average grain size in the range 10 $\mu$m to 40 $\mu$m (ordinary cement) or in the range 0.5 $\mu$m to 10 $\mu$m (microcement), and "very fine", particles with an average grain size in the range 0.05 μm to 0.5 μm, for example a latex, a silica ash type silica condensate, a condensate of manganese oxides in pigment ash, some fine soots, carbon black, or certain polymer microgels such as a fluid loss control agent.

In a particularly preferred variation of the invention, at least a third type of solid particles is provided, these being 5 times to 100 times smaller, and preferably being about 10 times smaller, than the "very fine" particles. For these "ultra fine" particles, dispersed colloidal silicas or aluminas (average grain size 3 nanometers (nm) to 60 nm, preferably 15 nm to 40 nm) or nanolatexes can be used. The composition advantageously comprises 10% to 40% of "very fine" particles and 5% to 30% of "ultra fee" particles, the percentages being with respect to the total volume of the solid particles in the composition. Compositions comprising 50% to 75% of microcement, 15% to 40% of "very fine" particles and 5% to 20% of "ultra fine" particles are particularly preferred.

Advantageously, in selecting the particles constituting the "fine", "very fine", and "ultra fine" particles, disjoint particle sizes are selected, i.e., they do not overlap to any great extent, a criterion which can generally be considered to have been satisfied if the grain size curves, expressed by volume, are shifted by at least a distance of half a peak, particle size being shown on a logarithmic scale.

Preferred compositions of the invention as defined have rheological properties which are particularly remarkable and which, even with very low fluid mixing quantities, are easy to mix and pour. For the same quantity of solid, slurries are obtained which are more fluid, which is of particular advantage in the case of squeeze cementing since this facilitates penetration of the slurry into the openings. Further, fluid losses are small—and in any case, less critical as indicated above. It is thus possible to produce dense compositions, in particular of more than 1.8 g/cm³ (15 ppg) which are perfectly adapted for secondary cementing operations and which combine little tendency to fluid loss with higher tolerance thereof.

This point is of particular advantage since, as indicated above, we have found that the high density compositions of the invention are less sensitive to fluid loss and are thus highly suitable for secondary cementing operations. High density compositions are normally associated with higher viscosities and as such are normally avoided as it is obvious that high viscosity is not favorable to good penetration into crevices or other narrow interstices. By operating under multimodal conditions, however, the most favorable conditions can be obtained. Preferably, the formulation of the invention is a tetramodal combination comprising at least four types of particles with different grain sizes, and more preferably a pentamodal composition which can further reduce the quantity of liquid required. More complex combinations are also possible but are, however, generally more expensive. It should be emphasized that whatever the number of "modes" used, disjoint grain sizes must be used, and a formulation with a continuous spread of grain sizes must be avoided. Without departing from the scope of the invention, it is of course possible, if necessary, to use materials of different natures but the same grain size which materials will then together constitute a single "mode".

It should also be noted that the proposed grain sizes are given by way of indication only; other materials can be used, provided that they comply with the criteria described above. It should also be noted that calculating PVF is a known, conventional technique and it is sufficient to note here that the components of a particulate mixture must be subdivided into grain size fractions, with satisfactory results being obtained by subdividing into about thirty or more fractions, for example.

Even in the absence of or in the presence of only small quantities of fluid loss control agent, the multimodal formulations of the invention are very resistant to fluid loss to the formation.

The density of a cementing composition of the invention can be adjusted very precisely without increasing the viscosity of the composition too much and thus without compromising its mixing and injecting ability, even in the absence of or the presence of only very small quantities of dispersing agents.

The following examples illustrate the invention and describe other advantageous details and features thereof, without in any way limiting the scope of the invention. These examples are illustrated in the accompanying drawings in which:

FIG. 1 shows a schematic view of an apparatus for testing the ability of a slurry to penetrate into the cracks, FIG. 2 shows three curves comparing the evolution of the viscosity of monomodal, bi—and trimodal compositions, and FIG. 3 shows grain size curves for latex (3A), carbon black (3B), a nanolatex (3C) and a colloidal silica (3D) used as particulate additives in the compositions of the invention.

Measuring Apparatus

The apparatus shown in FIG. 1 was used to simulate the flow of a cement slurry into a crevice. This apparatus was constituted by a transparent Plexiglas plate 1 placed on a sheet of filter paper 2 on a porous support plate. A channel was formed between transparent plate 1 and filter paper 2 by an adhesive strip 3 of known thickness (160 μm, unless otherwise indicated). Clips, not shown, held the plates together. The transparent plate had a hole 4.

The cement slurry was injected at 25° C. via hole 4 using a syringe 5 extended by a flexible plastics tube 6 and driven by a small motor, not shown, to displace the piston of the syringe at a constant rate. After injection, the filter paper was dried and the distance travelled by the cement into the channel delimited by the strip was measured. The length of the plate between hole 4 and the open end of the channel was 230 mm. The filter paper acted as an interface between the porous medium (the porous support plate) and a non porous medium (the transparent plate) thus simulating the medium into which a cement slurry is normally injected (natural formations, cement, etc).

This apparatus was used to test various cement formulations prepared with compounds whose characteristics are specified below.

Microcement:

The microcement used for the tests was a mixture of Portland cement and ground granulates of blast furnace clinker, type Spinor A-16, sold by Ciments d'Origny, France. Its chemical composition (given as the percentage by weight of dry matter) was as follows:

| SiO$_2$ | Al$_2$O$_3$ | Fe$_2$O$_3$ | CaO | MgO | K$_2$O | Na$_2$O | TiO$_2$ | SO$_3$ | Loss on ignition |
|---|---|---|---|---|---|---|---|---|---|
| 30.5 | 9.6 | 1.5 | 45.8 | 6.6 | 0.3 | 0.5 | 0.5 | 2 | 1.2 |

Its physical characteristics were as follows:

Density: 2.93 g.cm$^{-3}$

Average particle diameter: 4.6 µm

Maximum particle size: 16 µm

Specific surface area per unit weight determined by the air permeability test (Blaine fineness): 0.8000 m$^2$/g Results obtained with a Malvern Mastersizer laser particle size granulometric analyser:

Specific surface area: 1.5127 m$^2$/g

| Volume fraction of particles with grain size of less than | 10% 0.51 µm | 50% 2.99 µm | 90% 10.16 µm |
|---|---|---|---|

Cement:

The tests on ordinary cement were carried out on a class G Portland cement, Cemoil (a trade mark of 1a Compagnie des Ciments Belges). This cement had the following chemical composition (given as a percentage by weight of dry matter):

In the following table, the abbreviations used for the first three columns were the usual abbreviations for cement chemistry, i.e., $C_3A=3CaO.Al_2O_3$; $C_4AF=4CaO.Al_2O_3.Fe_2O_3$; and $C_3S=3CaO.SiO_2$.

| C$_3$A | C$_4$AF+C$_3$A | C$_3$S | MgO | 0.658 X K$_2$O+ Na$_2$O | SO$_3$ | Loss on ignition |
|---|---|---|---|---|---|---|
| 2.2 | 17.3 | 58.3 | 2.0 | 0.5 | 2.1 | 0.8 |

The physical characteristics were as follows:

Density: 3.23 g.cm$^{-3}$

Average particle diameter: 25.24 µm

Maximum particle size: 150 µm

Specific surface area per unit weight determined by the air permeability test (Blaine fineness): 304 m$^2$/g Results obtained with a Malvern Mastersizer laser particle size granulometric analyser:

Specific surface area: 0.3245 m$^2$/g

| Volume fraction of particles with grain size of less than | 10% 2.55 µm | 50% 20.91 µm | 90% 54.60 µm |
|---|---|---|---|

"Very fine" particles

SBR latex

Styrene butadiene latex (weight ratio 50:50), stabilized by a sodium salt of the condensation product of β-naphthalenesulfonic acid with formaldehyde. The percentages given for the compositions are based on the total latex volume, including the stabilizer.

The grain size curve is shown in FIG. 3A.

Average grain size 175.8 nm. 10.62% of the particles had a grain size of less than or equal to 650 nm; 9.9% had a grain size greater than or equal to 267.9 nm. The maximum measured size of the particles was 500 nm.

Soot

The grain size curve is shown in FIG. 3B.

Average grain size 3.32 nm. 10% of the particles had a grain size of less than or equal to 0.77 µm; 10% had a grain size greater than or equal to 26.99 µm. The maximum measured size of the particles was 80 nm.

Although the average size of the particles was substantially larger than for the latex, soot produced quite good results, probably because of its fairly high proportion of very fine particles.

Microgels

A fluid loss control agent was obtained by chemical cross linking of a polyvinyl alcohol, in accordance with the teaching of French patent application FR-A-2 704 219. The starting polyvinyl alcohol had a hydrolysis ratio of 88% (moles) and a molecular weight of 160 000. The cross linking agent was glutaraldehyde, the theoretical cross linking ratio was 0.19%. The percentages given for the cement compositions were based on concentrated 2.6% aqueous polymer solutions.

These products could be treated as particles with an average grain size of close to 70 nm with a maximum particle size of the order of several hundred nanometers. Direct measurement of size could not be carried out and size was estimated from other properties. "Ultra fine" particles Nanolatex Average grain size 26.8 nm. 8.9% of the particles had a grain size of not more than 18.5 nm; 10.3% had a grain size not less than 44.9 nm.

Maximum size measured: 90 nm.

The grain size curve is shown in FIG. 3C.

Colloidal silica

Average grain size 24.8 nm. 8.3% of the particles had a grain size of not more than 13 nm; 10.3% had a grain size not less than 44.9 nm.

Maximum size measured: 60 nm.

The grain size curve is shown in FIG. 3D.

Dispersing agents

Two types of commercial dispersing agents were used:

D1=sulfonated melamine—formaldehyde copolymer in aqueous solution, 20% by weight;

D2=45% by weight solution of a sodium salt of polynaphthalene sulfonate.

Other additives

The compositions of the invention can also comprise conventional liquid additives, such as:

antifoaming agents, for example based on tributyl phosphonate, polypropylene glycol, dibutylphthalate or polyorganosiloxanes. For the tests reported here, the antifoaming agent was an aqueous silicone emulsion, 35% concentration.

setting retarders, for example lignosulfonates—optionally partially desulfonated—of hydroxycarboxylic acids or salts of these acids, in particular tartric acid, D-gluconic acid, or heptonic acid. The agent used for these tests was a refined lignosulfonate.

liquid fluid loss control agents such as derivatives of 2-acrylamido-2-methylpropanesulfonic acid (AMPS).

The rheological measurements were carried out, after 20 minutes of conditioning at the measurement temperature (27° C.), using a rotary viscometer having an external rotating cylinder, model Chan 35 in accordance with the API standard, Section 10, Appendix H. The other measurements were also carried out at the same temperature. Fluid loss tests were carried out using filter paper over a standard grid in accordance with the API standard for microcements.

The units and symbols used were as follows (the units in brackets correspond to the units recommended by the API (American Petroleum Institute)). Concentration by volume [gps=US gallons per sack=volume (in US gallons) per 94 lb (42.676 kg) sack].
Ty: yield point (Pa) [lbf/100 sq ft].
PV: plastic viscosity (mPa.s) [cP].
FL: Fluid loss in 30 min (ml).
FW: Free water (ml).
Length: penetration depth in millimeters using the test described in FIG. 1. Settling: difference in densities between the top and the bottom of a 250 ml column, expressed as a percentage.

EXAMPLE 1

Three slurries with a density of 14 ppg (1.667 g.cm$^{-3}$) were prepared from a microcement under API standard conditions.

The fluid loss control agent was a microgel, and the dispersing agent was type D 1.

| # | Fluid loss control agent [gps] | Dispersing agent [gps] | antifoam agent [gps] | Ty [lbf/100f$^2$] | PV [cP] | FL [ml] | FW [ml] | Settling [%] | Length [mm] |
|---|---|---|---|---|---|---|---|---|---|
| 1 | — | 0.5 | 0.1 | 1.10 | 20.35 | 128 | 1 | <2 | 40 |
| 2 | 1.5 | 0.4 | 0.1 | 10.74 | 40.89 | 12 | 0 | 1.2 | 70 |
| 3 | 1.5 | 0.5 | 0.1 | 1.98 | 32.22 | 10 | 0 | <2 | 165 |
| 4 | 3 | 0.4 | 0.1 | 9.03 | 65.50 | 8 | 0 | 1.2 | 100 |

The values shown in the table clearly show the influence of fluid loss on the ability of the slurry to penetrate into a crack, even if—as is the case here—addition of a fluid loss control agent is accompanied by a relatively large increase in the viscosity of the slurry. Slurry #1, with very good rheology, only penetrated by 40 mm.

For substantially identical fluid loss, the slurry penetrated deeper when the rheology was lower (see #3 and #4).

EXAMPLE 2

For Example 2, a liquid AMPS low fluid loss liquid was used. For test #5, the only solid particles in the slurry were that of the microcement. For test #6, particles of colloidal silica were added at an optimized concentration with respect to the cement in order to approach the maximum PVF.

The dispersing agent was D2. The concentration of antifoaming agent was 0.1 gps.

The colloidal silica particles greatly reduced fluid loss, giving superior penetration, even if the rheology was degraded; in particular, the viscosity was greatly increased by particles of this type.

| # | Fluid loss control agent [gps] | Colloidal silica [gps] | Dispersing agent [gps] | Ty [lbf/100f$^2$] | PV [cP] | FL [ml] | FW [ml] | Length [mm] |
|---|---|---|---|---|---|---|---|---|
| 5 | 0.7 | — | 0.5 | 5.45 | 89.62 | 68 | 0 | 210 |
| 6 | 0.7 | 0.938 | 0.9 | 22.14 | 113.22 | 6 | 0 | 230 |

EXAMPLE 3

In this series of tests, slurries were prepared with a density of 14 ppg, using a microcement. The concentration of antifoaming agent was 0.1 gps.

The fluid loss control agent was a latex as described in European patent EP-A 0 091 377. The bi-modal mixture of microcement and latex had a maximum PVF for a latex concentration of 1.52 gps.

| # | Fluid loss control agent [gps] | Dispersing agent [gps] | Ty [lbf/100f$^2$] | PV [cP] | FL [ml] | FW [ml] | Settling [%] | Length [mm] |
|---|---|---|---|---|---|---|---|---|
| 7 | 2.5 | D1 - 0.4 | 3.22 | 36.33 | 24 | 0 | 3.6 | 105 |
| 8 | 1.52 | D1 - 0.5 | 1.36 | 36.55 | 26 | 0 | 2.3 | 220 |

-continued

| # | Fluid loss control agent [gps] | Dispersing agent [gps] | Ty [lbf/100f$^2$] | PV [cP] | FL [ml] | FW [ml] | Settling [%] | Length [mm] |
|---|---|---|---|---|---|---|---|---|
| 9 | 1.52 | D2 - 0.25 | 0.02 | 21.88 | 26 | 0 | 6.9 | 230/200$^{-1}$ |

~230 mm is the maximum crevice length. A length of 230 mm means that the fluid passed right through the crevice and flowed out of the other end. The value of 200 mm was obtained with a crevice of 120 µm.

The first conclusion to be drawn from the test, in particular when comparing tests #7 and #8, is that for identical fluid loss and plastic viscosities, a slurry penetrated into a crack further when its yield point was lower.

It should also be noted that compositions close to the maximum PVF, with lower quantities of fluid loss control agent, were far superior to the two others.

The well dispersed particulate additive, used under the preferred conditions of the invention (#8 and #9), produced excellent penetration.

EXAMPLE 4

The results reported here were obtained with optimized trimodal compositions. The slurry density was again 14 ppg, and the cement was a microcement.

| # | Fine particles [gps] | Very fine particles [gps] | Dispersing agent [gps] | Ty [lbf/100f$^2$] | PV [cP] | 10' gel [lb/100f$^2$] | FL [ml] | Length [mm] |
|---|---|---|---|---|---|---|---|---|
| 10$^{-1}$ | latex 1.443 | nanolatex 1.203 | D1 0.6 | 0.29 | 50.94 | 4 | 12 | 230 |
| 11 | latex 1.542 | coll. silica 0.938 | D1 2.2 | 2.06 | 32.32 | 17 | 26 | 230$^{-2}$ |
| 12 | latex 1.542 | coll. silica 0.938 | D2 0.9 | 3.73 | 40.89 | 11 | 6 | 230 |
| 13 | soot 13.5$^{-3}$ | coll. silica 0.930 | D2 2.2 | 33.8 | 110.28 | 67 | 2 | 210 |

$^{-1}$: Concentration of antifoam agent 0.4 gps.
$^{-2}$: The test was repeated with a 120 μm crevice. Again, the slurry flowed to the end of the plate opposite the injection end. With a 60 micrometer crevice, the slurry penetrated to a depth of 4 mm.
$^{-3}$: This additive was in the solid form, the concentration here is given as a percentage by weight of cement.

With these formulations, all four of which were trimodal, both low fluid loss and excellent rheology, in particular regarding dispersion, were obtained. In all cases, the slurry penetrated into the crevice without difficulty.

EXAMPLE 5

Three 14 ppg slurries formed from a microcement (M) or an ordinary cement were compared. In these tests, a crevice of 320 μm was used.

| # | Fluid loss control agent | Colloidal silica | Dispersing agent | Ty [lb/100f$^2$] | PV [cP] | 10' gel [lb/100f$^2$] | FL [mm] | Length [mm] |
|---|---|---|---|---|---|---|---|---|
| 14M | — | — | D1 - 0.5 | 1.1 | 20.35 | 16 | 128 | 150 |
| 15C | — | — | D2 - 0.12 | 0.76 | 8.36 | 7 | 764 | fingers |
| 16C | 1.69 | 1.029 | D1 - 1.5 | 1.71 | 21.97 | 19 | 26 | 230 |

Test 14M corresponded to a highly dispersed microcement recommended in the art for squeeze operations, but with no low fluid loss additive. Even though the crevice was 20 times larger than the largest particles in the microcement, and the ratio between the thickness of the crevice and the average diameter of the particles of the microcement was about 90, the 14M slurry penetrated to a depth of only 150 mm.

Cement slurry 15C, prepared from ordinary cement, with particularly low rheology, well dispersed and with low viscosity, merely formed fingers, i.e., the slurry just arrived at the entrance to the crevice but penetrated to a depth only of less than 1 mm. In other words, it was totally unsuitable for use in squeeze cementing.

In contrast, test 16C, again with ordinary cement, with the same level of dispersion but using a trimodal system, the different additives being added to produce a PVF close to the maximum PVF, produced highly satisfactory penetration, far better than that obtained in test 14M, which is a particularly remarkable result which perfectly illustrates the benefits of the invention.

Example 4 illustrates the particularly good results obtained with trimodal compositions. As shown in FIG. 2, this remarkable behavior is primarily due to relative insensitivity to fluid loss. The increase in viscosity for a cement composition without solid additives (monomodal composition) after a fluid loss of 100 ml was given reference point 100. Curves A and B show the fluid loss for the same increase in viscosity for bi-and trimodal compositions respectively. The very great superiority of compositions including particulate additives can be seen; the superiority is still higher when the density of the cement formulations is higher.

What is claimed is:

1. A squeeze cementing composition comprising water and a solid particulate phase comprising cement, wherein the cement particles have an average particle size of from 0.3 to 10 micrometers; at least one first particulate material which is insoluble in water, is compatible with said cement, and has a particle size smaller than the particle of said cement, wherein at least one first particulate material has an average particle size of from 0.05 micrometers to 0.5 micrometers and is selected from the group consisting of a styrene-butadiene rubber latex, a silica ash, a manganese pigment ash, carbon black, and a polymer microgel; the solid particulate phase composing a fluid loss control additive such that the composition has a fluid loss of less than 30 ml per 30 minutes measured according to API Spec. 10, and the proportion of the at least one first particulate material relative to the cement is such that the combination of the cement and the at least one first particulate material has a packing volume fraction which is substantially maximized.

2. The composition of claim 1 further comprising a dispersant.

3. A squeeze cementing composition comprising water and a solid particulate phase comprising cement, wherein the cement particles have an average particle size of from 0.3 to 10 micrometers; at least one first particulate material which is insoluble in water, is compatible with said cement, and has a particle size smaller than the particle of said cement, wherein at least one first particulate material has an average particle size of from 0.05 micrometers to 0.5 micrometers and is selected from the group consisting of a styrene-butadiene rubber latex, a silica ash, a manganese pigment ash, carbon black, and a polymer microgel; and water soluble fluid loss control additive such that the composition has a fluid loss of less than 30 ml per 30 minutes measured according to API Spec. 10, and the proportion of the at least one first particulate material relative to the cement is such that the combination of the cement and the at least one first particulate material has a packing volume fraction which is substantially maximized.

4. The composition of claim 3 further comprising a dispersant.

5. A squeeze cementing composition formed by combining water and a solid particulate phase comprising cement, wherein the cement particles have an average particle size of from 0.3 to 10 micrometers; at least one first particulate material which is insoluble in water, is compatible with said cement, and has a particle size smaller than the particle of said cement, wherein at least one first particulate material has an average particle size of from 0.05 micrometers to 0.5 micrometers and is selected from the group consisting of a styrene-butadiene rubber latex, a silica ash, a manganese pigment ash, carbon black, and a polymer microgel; the solid particulate phase composing a fluid loss control additive such that the composition has a fluid loss of less than 30 ml per 30 minutes measured according to API Spec. 10, and the proportion of the at least one first particulate material relative to the cement is such that the combination of the cement and the at least one first particulate material has a packing volume fraction which is substantially maximized.

6. A squeeze cementing composition formed by combining water and a solid particulate phase comprising cement, wherein the cement particles have an average particle size of from 0.3 to 10 micrometers; at least one first particulate material which is insoluble in water, is compatible with said cement, and has a particle size smaller than the particle of said cement, wherein at least one first particulate material has an average particle size of from 0.05 micrometers to 0.5 micrometers and is selected from the group consisting of a styrene-butadiene rubber latex, a silica ash, a manganese pigment ash, carbon black, and a polymer microgel; and water soluble fluid loss control additive such that the composition has a fluid loss of less than 30 ml per 30 minutes measured according to API Spec. 10, and the proportion of the at least one first particulate material relative to the cement is such that the combination of the cement and the at least one first particulate material has a packing volume fraction which is substantially maximized.

7. The composition of claim 5 further comprising a dispersant.

8. The composition of claim 6 further comprising a dispersant.

9. The composition of claim 1, which further comprises at least one second particulate material which is insoluble in the water and has a particle size smaller than the at least first particulate material, the ratio of the average particle size of the at least first particulate material to the average particle size of the at least one second particulate material being from 5 to 100, and in which the proportions of the at least one first particulate material and the at least one second particulate material with respect to the cement are such that the combination of the cement, the at least one first particulate material, and the at least one second particulate material has a packing volume fraction which is substantially maximized.

10. The composition of claim 9 in which the at least one second particulate material has an average particle size of from 3 nanometers to 60 nanometers.

11. The composition of claim 9 in which the at least one second particulate material has an average particle size of from 15 nanometers to 40 nanometers.

12. The composition of claim 10 in which, by total volume of solid particles in the composition, comprises from 50 percent to 75 percent of a cement having an average particle size less than 15 micrometers;

from 15 percent to 40 percent of the at least one first particulate material; and from 5 percent to 20 percent of the at least one second particulate material.

13. The composition of claim 11 in which the at least one first particulate material is present from 10 percent to 40 percent and the at least one second particulate material is present from 5 percent to 30 percent, the percentages based on the total volume of solid particles in the composition.

* * * * *